United States Patent [19]

Boldebuck et al.

[11] 4,233,435

[45] Nov. 11, 1980

[54] POLYESTERIMIDE RESINS AND SYNTHESIS THEREOF

[75] Inventors: Edith M. Boldebuck, Schenectady, N.Y.; Eugene G. Banucci, Mt. Vernon, Ind.; Martin A. Byrne, Troy, N.Y.

[73] Assignee: General Electric Company, Schenectady, N.Y.

[21] Appl. No.: 867,939

[22] Filed: Jan. 9, 1978

[51] Int. Cl.³ ............................................. C08G 69/26
[52] U.S. Cl. ................................... 528/350; 525/928; 528/289
[58] Field of Search ......... 260/75 N, 47 CZ, 857 PA; 528/289, 350; 525/540, 928

[56] References Cited

U.S. PATENT DOCUMENTS

| | | | |
|---|---|---|---|
| 3,426,098 | 2/1969 | Meyer et al. | 260/841 |
| 3,461,136 | 8/1969 | Pruckmayr et al. | 528/289 |
| 4,045,407 | 8/1977 | Keske et al. | 260/47 CP |
| 4,069,209 | 1/1978 | Lange | 528/289 |
| 4,075,179 | 2/1978 | Karkoski et al. | 260/47 CZ |
| 4,118,392 | 10/1978 | Salle et al. | 528/289 |

*Primary Examiner*—Lorenzo B. Hayes
*Assistant Examiner*—Amelia B. Yarbrough
*Attorney, Agent, or Firm*—Joseph T. Cohen; James C. Davis, Jr.

[57] ABSTRACT

An improved substantially solvent-free process for preparing phthalate-moiety based polyesterimide resins, new resins prepared by the process, and substrates (e.g., electrical conductors) coated with compositions comprising the new resins are described.

24 Claims, No Drawings

4,233,435

POLYESTERIMIDE RESINS AND SYNTHESIS THEREOF

BACKGROUND OF THE INVENTION

The present invention relates to a new improved substantially solvent-free process for preparing phthalate-moiety based polyesterimide resins, to new resins prepared by the process, and to substrates (e.g. electrical conductors) coated with compositions comprising the new resins.

Polyesterimide (PESI) resins have typically heretofore been prepared from phthalate-moiety-contributing compounds (e.g. lower dialkyl esters of terephthalic or isophthalic acid) using syntheses wherein inert solvents are employed. As used herein, "inert solvents" and terms of similar import mean solvents which do not react with monomeric reactants from which PESI resins are synthesized. Thus, PESI resins have been synthesized by heating, in the presence of inert solvents (e.g. cresol) reaction mixtures of phthalic acid lower dialkyl ester with diol, triol, diamine and carboxylic acid anhydride having an additional carboxyl group. Such solution syntheses have not been entirely satisfactory due to high cost of the solvents and increasingly stringent governmental regulations on emission and disposal thereof.

Attempts to carry out such PESI synthesis in the absence of inert solvents have not been entirely satisfactory in that the lower alkyl phthalate esters undergo sublimation from the reaction mixtures resulting in deposition of flow-hindering solid deposits in conduits provided for recovering by-product vapors released from the reacting mixtures, deviations from the preselected relative amounts of reactants in the reacting mixtures, and other problems. Moreover, we have found that in the absence of a solublizing amount of inert solvent, rapid increases in resin viscosity (i.e. molecular weight) in later stages of the synthesis undesirably occur. This creates additional control problems including, in some instances, gelling of the resin in the synthesis vessel.

Precopio et al, U.S. Pat. No. 2,936,296, discloses a process for preparation of polyester resins from, e.g., dimethyl terephthalate (DMT), ethylene glycol (EG), and a saturated aliphatic trihydric alcohol, wherein the reaction is carried out with xylene or a similar material added to the reaction mixture for the stated purpose of preventing sublimation of DMT. As described therein, the added material (e.g. xylene) takes no part in the reaction. George et al, U.S. Pat. No. 3,297,785, discloses modified polyester resins and broadly suggests that unsaturated alcohols, e.g. allyl alcohol-glycol maleates, may be utilized in modifying their polyesters.

PESI polymers and processes for synthesis thereof are described in the following representative U.S. Pat. Nos.: 3,382,203 (Rating et al), 3,426,098 (Meyer et al), 3,853,817 (Weddleton), 3,931,418 (Riskin) and 4,038,254 (Schade et al). The Risken patent further discloses (at column 2, line 57–60) that up to 25% of the ester groups of their resins may optionally be replaced by acid amide groups by replacing some of "the" alcohols with amino alcohols or polyamines and indicates (in the paragraph bridging column 5 and column 6) that such amines (e.g. including ethanolamine) can be reacted with carboxyl groups available for esterification to form acid amide compounds.

Keske et al, U.S. Pat. No. 4,045,407, describes a process for preparing polyamideimides which comprises reacting a composition comprising an aromatic diprimary amine and a tricarboxylic acid compound in an alcoholic solvent comprising a monohydric alcohol containing from about 4 to 10 carbon atoms. As therein described, (1) where only a diprimary aromatic amine is reacted, a tertiary amine is required in the alcoholic solvent, (2) if a glycol is employed, it can be present in an amount up to 15% of the total amount of glycol and alkanol, and (3) the total concentration of alkanol, glycol and tertiary amine comprises 20 to 75% of the reaction mass. Each of the patents cited above is incorporated herein by reference.

However, the prior art did not recognize that, as it has now been found by practice of the present invention, the foregoing and other problems in solventless synthesis of PESI resins can be eliminated to a substantial extent by a new improved synthesis process wherein there is included in the reaction mixture an organic component containing monohydric alcohol functionality. The monohydric alcohol may contain other functional groups, e.g. oxy, alkoxy, etc., but preferably is free of other functional groups which react with carboxyl groups to form esters, acid amides, etc. It has also now been found that PESI resin products prepared by the process of this invention exhibit substantially improved stability against premature curing for prolonged periods of time.

DESCRIPTION OF THE INVENTION

Generally stated, in one aspect, the present invention provides a process for preparing a polyesterimide (PESI) resin which comprises reacting under ester imide resin forming conditions a composition comprising:

(I) an imide-group-contributing component selected from the group consisting of
  (A) both (1) a diamine and (2) an anhydride component including at least one (a) aromatic carboxylic acid anhydride containing at least one additional carboxylic group, said additional group being esterifiable and substantially nonimidizable or (b) the corresponding acid thereof containing two imide forming vicinal carboxylic groups in lieu of the anhydride group,
  (B) the carboxy functional polyimide reaction product of said diamine component and said anhydride component, and
  (C) mixtures of (A) above and (B) above; (II) an ester-group-contributing component comprising
  (D) at least one dihydric alcohol containing two esterifiable hydroxyl groups,
  (E) at least one polyhydric alcohol containing at least three esterifiable hydroxyl groups,
  (F) at least one lower dialkyl ester of a phthalic acid component selected from the group consisting of terephthalic acid, isophthalic acid, and mixtures of said acids; and
  (G) an organic compound containing monohydric alcoholic functionality and having a boiling point at the pressure employed of not less than the sublimation temperature of said lower dialkyl ester at said pressure.

In a preferred embodiment of the process, the reaction mixture is substantially free of solvents which do not react to form either imide groups or ester groups. In another preferred embodiment, the diamine component includes at least one aromatic diamine, and more preferably, no aliphatic diamine is present. In still another preferred embodiment, the process includes the additional step of removing the resulting lower alcohol derived from the lower dialkyl ester. In yet another preferred embodiment, component I above is a mixture of a diamine and a trimellitic component selected from the group consisting of trimellitic acid, trimellitic anhydride and mixtures thereof; and reaction is continued until at least 50% of the theoretical amount of the lower alcohol derived from the lower dialkyl ester is formed and until at least 50% of the theoretical amount of water of esterification of the additional —COO— group of the trimellitic component is formed, preferably with removal of the lower alkyl alcohol and water of such esterification upon formation thereof.

In addition to substantially eliminating sublimation problems of the lower dialkyl esters, substantially minimizing the rapid increases in resin viscosity in later stages of the synthesis, and formation of PESI resin products typically characterized with substantially improved stability, all as described above, the present process advantageously permits polymerization to further extent (i.e. higher percent of theoretical amount of lower alkyl alcohol distillate formation and desirably removal thereof) and at the same time forming ester imide resins having lower melt viscosity than is typically observed for a given extent of polymerization of the above reactants without employing the monohydric alcohol component.

Generally stated, in another aspect thereof, the present invention is for the products formed by the above process, in its generally stated form and in the various embodiments set out therefor above.

In still another aspect, the present invention is for a substrate coated with the products prepared by the above processes. The coating may be cured or uncured as desired. In a preferred embodiment of the coated substrate, the substrate is an electrical conductor, e.g. a wire.

All the resins prepared by the present process are useful for forming protective coatings which typically are tough and durable.

DETAILED DESCRIPTION OF THE INVENTION AND MANNER AND PROCESS OF MAKING AND USING IT

The first step in carrying out the PESI synthesis process is selection of the particular reactants and preparation of the reaction mixture thereof. As indicated above, the carboxyl functional polyimide contributing component can initially be formed separately and subsequently reacted with the polyester or ester-group-contributing component. Preferably, the PESI resin synthesis is effected by initially forming a reaction mixture wherein substantially all the ester-group forming and imide-group forming reactants are present in monomeric form. The balance of this detailed description is given principally with reference to this latter preferred reaction mode.

Thus the various ingredients initially may be added to any suitable reaction vessel, which may be formed of any suitable material such as, for example, glass, stainless steel, or any other metal commonly employed in synthesizing polyesters, polyimides, and polyesterimides. It is desirable to heat the reactants to obtain a high molecular weight material but without causing gellation of the resulting resin. For resins intended for end use application from the molten state, in general the molecular weight (M.W.) preferably is in a range such that the melt viscosity is from about 500 cp to about 15,000 cp at a temperature of 150° C. For powder coating applications, the M.W. preferably is in a range such that the melt viscosity is from about 1000 to about 5000 cp at 200° C. The reaction may be effected by heating the reactants preferably with stirring (after the mixture is heated to a stirrable state), from room temperature to a temperature of about 200° to 230° C. over a period of, for example, from about 2 to about 6 hours. Since the lower dialkyl esters of the phthalic acids tend to sublime when heated too rapidly, it is desirable to provide means for condensing this sublimate while still allowing the liberated lower alcohols and water vapor (including water of imidization) to escape from the system. A condenser may be operated over the reaction vessel at a temperature suitable to condense the sublimate while allowing the gaseous water and lower alcohol to escape. After heating the reactants to the desired final temperature, the reaction may be stopped or the product may be maintained at the final temperature for another 2 to 4 hours to increase the molecular weight. When the product is maintained at this final temperature, it is necessary to stop the reaction before the resin reaches such a high molecular weight that gellation occurs.

Although the reaction may be terminated by pouring a suitable solvent into the hot ester imide polymer resin, the molten resin is preferably immediately poured or dumped from the reaction vessel and allowed to cool, e.g. to room temperature, without the addition of any solvent. This results in a brittle solid mass which may be ground into a powder if desired. The resin product is eminently suitable for coating a wide variety of substrates using the resin in powder form or for molten application from a molten mass thereof.

If desired an azeotroping solvent (e.g. xylene) can be included in the reaction mixture, typically at the start of the reaction, to aid in distilling the water and lower alcohols which are liberated. Typically, if included, the xylene is distilled before completion of the polymer-forming reaction. However, it is emphasized that the xylene or similar material is not necessary to overcome the sublimation problems of the lower alkyl esters, since substantial elimination of sublimation and plugging problems resulting therefrom are effectively obtained by inclusion of an organic compound having monohydric alcohol functionality in accordance with the present invention.

The diamine component may be almost any imide-forming diamine or a mixture of two or more such diamines in order to obtain the synthesis process advantages described above. Aromatic diamines are generally preferred. Suitable aromatic diamines include for example, 4,4'-methylene dianiline, 4,4'-oxydianiline, m-phenylene diamine, benzidine, 1,4-diaminonaphthalene, α,ω-nonamethylene diamine, xylene diamine, 3,3'-diaminodiphenyl, p-phenylene diamine, toluene diamine, 4,4'-diamino diphenylsulfone, 3,4'-diaminobenzophenone, etc. Suitable aliphatic diamines include for example, hexamethylene diamine, ethylene diamine, 4,4'-dicyclohexylmethane diamine, and the like. Additional diamines suitable herein are set forth in the above cited patents to Meyer et al, Weddleton, and Keske et al. In general, the preferred diamines are first 4,4'-methylenedianiline (MDA) and second, 4,4'-oxydianiline (ODA).

The anhydride component may be almost any aromatic carboxylic acid anhydride containing at least one additional carboxylic group or the corresponding acid thereof containing two imide-forming vicinal carboxylic groups in lieu of the anhydride group. Mixtures thereof are also suitable. This applies as to the advantages achieved by the synthesis process as noted above. The additional carboxylic group must be esterifiable in order to link the polyimide with the polyester contributing portion of the ester imide resin and preferably is substantially nonimidizable. The anhydride component preferred herein is trimellitic acid or trimellitic anhydride or mixtures thereof. Trimellitic anhydride includes two vicinal carboxylic groups in anhydride form and a single nonvicinal carboxylic group which is substantially non-imidizable but is readily esterifiable. Trimellitic anhydride is hereinafter referred to sometimes as TMA. Other anhydrides suitable herein, in some instances alone, but preferably in admixture with TMA, include for example, pyromellitic dianhydride, benzophenone-2,2',3,3'-tetracarboxylic dianhydride, 2,2-bis[4-(3,4-dicarboxyphenoxy)phenyl]propane dianhydride (hereinafter 4-BPADA), 2,2-bis[4-2,3-dicarboxyphenoxy)phenyl]propane dianhydride (hereinafter 3-BPADA). The latter two compounds are described along with methods for preparation thereof by Heath and Wirth in U.S. Pat. No. 3,972,902, incorporated herein by reference. These BPADA compounds are described in the latter patent under the names 4,4'-ispropylidene-bis (3- and 4-phenyleneoxyphthalic anhydride). Where included such other suitable dianhydrides or the corresponding acids are preferably in addition to TMA or the corresponding tri-acid thereof. For best results in applications of the end product ester imide resins for use in coating electrical conductors, the total weight of such additional anhydrides or acids is limited to an amount corresponding to up to about 1.0 imide groups formed therefrom per total moles of the TMA or tri-acid thereof.

The diamine and anhydride components are preferably included in such relative molar amounts that there are present from about 1.92 to about 2.08 imide-forming vicinal carbonyl groups (e.g. —C(=O)—O— of the vicinal acid groups) per amine group in the diamine component, and preferably two such —COO— groups per one amine group. In the case of anhydride functionality, the two vicinal —COO— groups would be condensed into one —C(=O)—O—(O=)C—group. Thus in the preferred embodiment of the imide-contributing component wherein TMA is the anhydride component, two moles of TMA would be included per mole of MDA to form a dicarboxy functional di-imide, the formula for which is shown in the above cited Meyer patent at column 2, line 20 thereof.

For use as insulating coatings on electrical conductors, the polyimide portion of the esterimide resin is preferably prepared using MDA as the diamine and TMA as the anhydride component.

If desired, the polyimide-contributing component may be separately formed and recovered using a method substantially as that illustrated in the above cited Weddleton patent at column 4, lines 14–40 thereof.

The dihydric alcohol component may be almost any alcoholic diol containing two esterifiable hydroxyl groups in order to achieve the synthesis process advantages described above. Mixtures of suitable diols may also be included. Suitable diols for use herein include for example, ethylene glycol, propylene glycol, 1,4-butane diol, 1,5-pentane diol, neopentyl glycol, etc. Ethylene glycol is generally preferred, and results in generally better ultimately cured esterimide resins in end applications, e.g. as wire insulation.

The polyhydric alcohol component may be almost any polyhydric alcohol containing at least 3 esterifiable hydroxyl groups in order to provide the above described synthesis process advantages of this invention. Mixtures of such polyhydric alcohols may suitably be employed. Suitable polyhydric alcohols include, for example, tris(2-hydroxyethyl) isocyanurate, glycerine, 1,1,1-trimethylolethane, 1,1,1-trimethylolpropane, mixtures thereof and the like. THEIC (the first mentioned polyhydric alcohol) is generally preferred for improved coating properties, especially in wire enamel and other electrical conductor coating applications.

The lower dialkyl ester component of a phthalic acid may be almost any lower dialkyl ester of a phthalic acid selected from the group consisting of terephthalic acid, isophthalic acid, and mixtures thereof. These dialkyl esters may be, for example, the dimethyl, diethyl or dibutyl esters of such phthalic acids. The preferred lower dialkyl ester is dimethyl terephthalate (DMT).

The organic component containing monohydric alcoholic functionality (i.e. having an —OH group functionality of one) can be almost any monohydric alcohol having a boiling point at the pressure employed in the reaction of not less than the sublimation temperature of the lower dialkyl ester having the lowest sublimation temperature at the pressure employed. A mixture of two or more such monohydric alcohols may be employed. At least one linear or branched monohydric alcohol having a normal boiling point (i.e. at 760 mmHg absolute pressure) of from about 150° C. to about 270° C. is preferred, and more preferably the normal boiling point (B.P.) is from about 180° C. to about 270° C. Suitable monohydric alcohols include, for example, n-hexanol (B.P. 157° C.), 2-ethylhexanol (B.P. 183° C.), n-nonanol (B.P. 213° C.), n-decanol (B.P. 231° C.), n-dodecanol (B.P. 255° C.), tetrahydrofurfurol (B.P. 180° C.), 2-butyloctanol (B.P. 252° C. tetradecanol (B.P. 264° C.) 2,6,8-trimethylnonane-4-ol (B.P. 225° C.), and the like. Two or more monohydric alcohols may be included in the reaction mixture. Each monohydric alcohol employed is preferably a saturated aliphatic alcohol. In general, linear or branched monohydric alcohols having from 8 to 10 carbon atoms are preferred, while 1-decanol is generally the best monohydric alcohol.

The various components of the reaction mixture may be included in any suitable amounts. For better coating properties per 100 parts by total weight of components "a" through "e" below: (a) the diol is included in an amount from about 0.035 to about 0.250 mole (b) the polyhydric alcohol is included in an amount from about 0.025 to about 0.150 mole, (c) the lower dialkyl ester of a phthalic acid is included in an amount from about 0.030 to about 0.180 mole, (d) the imideforming anhydride component is included in an amount from about 0.100 to about 0.200 mole, (e) the diamine component is included in an amount from about 0.050 to about 0.100 mole, and (f) the organic compound containing monohydric alcohol functionality is included in an amount of from about 1.000 to about 20.00 parts and preferably from about 1.000 to about 10.00 parts, while the amount of the diamine component relative to the amount of the anhydride component is in the range set forth above and preferably about one equivalent of amine groups per one equivalent of anhydride groups, and the ratio (defined below) of —OH groups to —COO— groups is more than one.

As used herein, the term "mole" and "part-mole" of a component mean the weight in parts, e.g. grams, of the average molecular weight (M.W.) of the component in parts per part-mole (e.g., M.W. in grams per grammole).

The ester imide resins produced herein are preferably hydroxyl-group terminated and accordingly the ratio of the total number of hydroxyl (—OH—) groups in the mono-,di-, and polyhydric alcohol components to the total number of ester-forming carboxyl (—COO—) groups in the anhydride component and in the lower dialkyl esters is more than 1 —OH group per —COO— group. Preferably such ratio is from about 1.05 to about 2.5, and more preferably from about 1.1 to about 2.0, —OH groups per —COO— group. The —COO— groups included in the above ratios are the —COO—(lower alkyl) ester groups of the ester-group contributing phthalic acid component and the esterifiable substantially nonimide-forming —COO— group or groups, e.g. —COOH groups, of the anhydride component. Any carbonyl groups in the imide-forming anhydride groups or corresponding vicinal —COOH groups on the anhydride or corresponding acid are not included in the —COO— groups of the above —OH/—COO— group ratio.

As indicated above, the reaction mixture is preferably substantially free of solvents which do not react to form imide groups and free of solvents which do not react to form ester groups.

Preferably the diamine component includes at least one aromatic diamine and more preferably no aliphatic diamine is present in order to provide cured coatings having improved thermal properties.

The lower alcohol liberated upon transesterification of the lower dialkyl ester is preferably removed and more preferably in a continuous manner while it is being formed. The water of reaction is similarly preferably removed and more preferably in a continuous manner while it is being formed.

In a preferred process:

(a) the diamine component comprises a diamine selected from the group consisting of MDA; ODA and mixtures thereof (preferably MDA), (b) the dianhydride component comprises (and preferably consists solely of) a member selected from the group consisting of TMA, trimellitic acid, and mixtures thereof (preferably TMA), (c) the at least one dihydric alcohol comprises ethylene glycol (and preferably is ethylene glycol alone), (d) the at least one polyhydric alcohol comprises THEIC (preferably as the sole polyhydric alcohol having an OH functionality of three), the lower dialkyl ester is a diester of terephthalic acid (preferably DMT), and the organic compound having monohydric alcohol functionality is a linear or branched monohydric alcoholic compound having a normal boiling point from about 150° C. to about 270° C. or a mixture of two or more of said compounds (preferably linear or branched $C_8$ to $C_{10}$ aliphatic alcohols or mixtures thereof).

A highly preferred reaction mixture comprises (a) from about 0.035 to about 0.250 mole of ethylene glycol (preferably about 0.11 to 0.15 mole), (b) from about 0.025 to about 0.150 mole of THEIC (preferably about 0.09 to 0.14 mole), (c) from about 0.030 to about 0.180 mole of DMT (preferably about 0.10 to 0.14 mole), (d) from about 0.100 to about 0.200 mole of TMA (preferably about 0.10 to 0.16 mole), (e) from about 0.050 to about 0.100 mole of MDA (preferably about 0.05 to 0.08 mole), and (f) from about 1.000 to about 10.00 parts of a monohydric alcohol having from 8 to 10 carbon atoms, wherein the amounts are per 100 parts by weight of the total weight of the five components in (a) through (e) above.

An alcoholysis catalyst is preferably employed in carrying out the ester imide forming reaction, especially the formation of the ester group contributing component. Almost any alcoholysis catalyst may be employed, such catalysts being well known in the art. Suitable catalysts include for example the titanate esters, e.g. tetrakis(2-ethyl hexyl) titanate, tetraalkylene glycol titanate, di(triethanol amine) diisopropyl titanate and mixtures thereof; maganese soaps; lead oxide; dibutyl tin oxide; and the like. Tetrakis(2-ethyl hexyl)titanate is sometimes referred to as tetraoctyl titanate and is commercially available from the DuPont company as "TYZOR" TOT. Other suitable titanate catalysts include the tetra-R titanates wherein R represents alkyl groups such as for example isopropyl, methyl, butyl, hexyl and n-propyl. Other suitable catalysts include for example, lead acetate, zinc oxide, cadmium acetate, cuprous acetate, zinc acetate, magnesium acetate, beryllium acetate, stannic acetate, ferric acetate, nickel acetate, etc. The amount of catalyst employed is not critical and may vary over a wide range depending upon the particular system being reacted. In general, the alcoholysis catalyst may be present in an amount of from about 0.01 to about 5% by weight based on the total weight of the reactants. Higher concentrations of the catalyst may be employed but no advantage is gained by such use. Preferably the catalyst is tetraoctyltitanate, employed in an amount of about 0.015% by weight of titanium on the foregoing weight basis.

In the above preferred reaction mixtures, it is further preferred to include 3-BPADA, 4-BPADA, or mixtures thereof (preferably 4-BPADA) with TMA in the anhydride component for further improvement in protective coating properties, especially from the standpoint of insulating coatings on electrical conductors, e.g. magnet wire.

Practice of the present invention is further illustrated by the following non-limiting examples. All parts and percentages throughout this disclosure and in the claims which follows are by weight unless otherwise indicated.

The apparatus employed in the examples was a 1 to 2-liter resin kettle of generally spherical shape with a heating mantle disposed about the bottom half and connected to an electronically controlled Therm-o-Watch for temperature control. The kettle was equipped with a removable cover having ports therein through which are received a double bladed paddle stirrer, operated by a Servo-Dyne to maintain constant RPM, a stirring bore connected to a lubricant trap to catch any excess lubricant, a thermometer, and a Y-tube connected to a Dean and Stark trap communicating with a condenser which is fitted with a nitrogen by-pass for maintaining a nitrogen bleed or blanket on the reaction system.

EXAMPLE 1

This example illustrates lower alkyl diester sublimate deposit and plugging problems in the synthesis of ester imide resins when no monohydric alcohol is present.

The following reaction mixture components were added in the indicated amounts to a two-liter resin kettle equipped as described above: 93.0 grams (g.) (1.5 mole- )EG, 301.62 g. (1.156 moles) THEIC, 257.63 g. (1.328 moles) DMT, 114.05 g. (0.576 mole) MDA, 221.95 g. (1.155 moles) TMA. The cover with the above assemblage of equipment was placed on the kettle and heating was started. When the reaction mixture became semi-molten (at a temperature of about 80°–100° C.) stirring was started. After heating for about 0.5 hour, the temperature of the reaction mixture had increased to 120° C., at which temperature a yellow-red precipitate formed. The reaction mixture became homogeneous a few minutes thereafter while stirring at about 500–750 RPM. After a total of about 0.6 hour the temperature had increased to 140° C., at which temperature DMT began to sublime and solidify on the upper wall of the kettle in the vapor space above the molten reaction mixture. Sublimation and deposition of the sublimate continued for about 20 minutes during which time the Y-tube became clogged with the accumulated deposit. It was necessary to apply heat from a heat gun to the accumulated sublimate to re-melt the same and permit the molten sublimate to return to the reaction mixture. After a total heating time of about 1.25 hour (reaction temperature of 205° C.), 0.88 grams of TOT catalyst was added and stirred in. At a total heating time of 1.75 hours and a mixture temperature of 221° C., the reaction mixture became clear, homogeneous and red. The temperature was maintained at about 220° to about 225° C. until the total heating time was about 2.7 hours, during which time a total of 98 grams of condensed distillate was collected (representing 93% of the theoretical total amount of water of imidization, water of esterification, and methanol which would be liberated upon complete reaction of all the ingredients, (i.e. (2)×(moles of TMA)×(18) plus (2)×(moles of DMT)×(32). After a total of 3.5 hours of heating, the reaction was stopped with no additional distillate having been collected during the final 0.8 hour. Termination of the reaction was effected by removing the cover and immediately pouring the thus formed resin product into an aluminum pan and cooling to room temperature therein.

EXAMPLE 2

This example illustrates the preparation of a polyester imide resin with substantial elimination of DMT sublimate plugging problems using decanol as the monohydric alcohol. The procedure employed in this example was substantially identical to that of example 1. except that a monohydric alcohol was employed and all the catalyst was added in the initial charge to the kettle. Thus, to a two-liter resin kettle equipped as described above were added the following ingredients in the indicated amounts: 44.18 (0.7125 mole) ethylene glycol (EG), 11.87 g. (0.075 mole) n-decanol (DA), 150.34 g. (0.576 mole) tris(2-hydroxy ethyl)isocyanurate(-THEIC), 128.82 g. (0.664 mole) dimethyl terephthalate (DMT), 57.28 g. (0.289 mole) 4,4'-methylene dianiline (MDA), 110.59 g. (0.576 mole) trimellitic anhydride (TMA), and 0.4 g. tetrakis (2-ethyl hexyl) titanate (TOT) as catalyst. The kettle cover was affixed and heating was started. Stirring was started when the reaction mixture became semi-molten (at a temperature of about 80°–100° C.). After 0.5 hour total heating time (at a temperature of 140° C.), a yellow-brown precipitate formed and shortly thereafter (about 2-3 minutes) the reaction mixture became homogeneous. When a temperature of 170° C. was reached, distillation began as evidenced by formation of water and methanol condensate in the condenser with essentially no DMT in the distillate. After heating for a total of 1.25 hours, the temperature rose to 220° C. and the reaction mixture became clear, homogeneous, reddish and very fluid. Then the stirring rate was increased to 750 RPM and maintained thereat until 2 to 2.25 hours after heating was started. The stirring rate was then increased to 1,000 RPM and the temperature was maintained at about 225° C. for an additional approximately 20–30 minutes with no additional distillate condensation taken place, after which the reaction was terminated as in example 1.

EXAMPLES 3–6

In these examples the procedure of Example 2 was substantially repeated except that the amount of 1-decanol was increased and the amount of EG was decreased. The other components were included in these examples in the same amounts thereof used in example 2 with the exception of examples 4–6, wherein the amount of TOT was 1.9 grams. Observations showed that no sublimation deposit problems were encountered in these examples. The rate of increase in resin melt viscosity near the end of the reaction was less in each of these examples than in example 1. The amounts of 1-decanol, EG, and TOT catalyst for examples 3-6 are shown in Table I below.

TABLE I

| Component | Example No. | | | |
|---|---|---|---|---|
| | 3 | 4 | 5 | 6 |
| 1-Decanol (grams) | 23.74 | 59.36 | 97.35 | 118.71 |
| 1-Decanol (moles) | 0.15 | 0.375 | 0.612 | 0.75 |
| EG (grams) | 41.85 | 34.88 | 27.44 | 23.25 |
| EG (moles) | 0.675 | 0.563 | 0.443 | 0.375 |
| TOT (grams) | 0.4 | 1.90[a] | 1.90[a] | 1.90[a] |

[a] 50% added in the initial charge and 50% added after the reaction mixture became homogeneous.

The polyester imides prepared in examples 1–6 were tested for storage stability for prolonged periods of 14–15 months of storage of samples thereof in tightly capped containers at room temperature. Gel-time for these samples were determined soon after the resins were prepared and again after the prolonged storage period. The results are shown in Table 2 in columns 4–6 thereof. Increasing gel-time after storage (column 5) indicates increased storage stability while this property is also shown by low ratios of initial gel-time to "stored" gel-time (column 6). The data shows that 1-decanol inclusion in the ester imide forming reaction mixture effects improved storage stability of the resins prepared by the process of this invention, and to an increasing extent as the weight percent of decanol in the reaction mixture is increased.

Portions of the resins prepared in examples 1–6 were ground into fine powders, spread onto an electrically conductive aluminum substrate using well-known spreading techniques, and thereafter fused and cured into approximately 8 mil thick cured films by heating at 300° C. for 10 minutes. The cured films were observed for the number of bubbles therein and the results are shown in column 7 of Table II. The data shows that inclusion of 1-decanol in the reaction mixture effects formation of ester imide resins, which upon curing in the form of films result in improved freedom from bubbles.

Also shown in Table II are the weight percents of 1-decanol included in the reaction mixtures, as well as the amount of distillate recovered during the resin forming reaction, as a percent of the theoretical amount (as described in example 1).

TABLE II

| Example | Monohydric Alcohol | (WT %)$^a$ | Gel Time (minutes at 230° C.)$^b$ | | | Number of bubbles in 8-mil Cured Film | Recovered Distillate (% of theoretical Amount) |
|---|---|---|---|---|---|---|---|
| | | | Initial-I | Stored-S | Ratio(I/S) | | |
| 1 | none | | 6.50 | 0.5$^c$ | 13.0 | many | 93 |
| 2 | -Decanol | (2.4%) | 5.25 | 1.25$^d$ | 4.2 | moderate | 101$^e$ |
| 3 | -Decanol | (4.6%) | 7.25 | 2.75$^d$ | 2.6 | very few | 97 |
| 4 | -Decanol | (11.0%) | 5.75 | 3.25$^c$ | 1.3 | very few | 101$^e$ |
| 5 | -Decanol | (17.0%) | 6.5 | — | — | very few | 111$^e$ |
| 6 | -Decanol | (20.2%) | 8 | — | — | nil | 99 |

$^a$Based on total weight of the reaction mixture
$^b$Determined by the gel time test described in allowed copending U.S. Patent Application Serial Number 751,045 (E. Boldebuck & B. Gorowitz), filed December 16, 1976, assigned to the assignee hereof, and incorporated herein by reference
$^c$Stored 15 months at room temperature (about 20° C.)
$^d$Stored 14 months at room temperature (about 20° C.)
$^e$Amounts greater than 100% indicate that some EG was distilled

EXAMPLES 7-11

These examples illustrate the esterimide resin forming process of this invention employing a variety of monohydric alcohols in the reaction mixture. The reaction process was carried out for each of these examples substantially in accordance with the procedure of Example 2 and using the same amounts of THEIC, DMT, TMA, and MDA as employed in that example. The monohydric alcohol types, weight percents, grams and moles thereof as well as the number of grams and moles of EG including the reaction mixtures for these examples are set forth in Table 3. Also shown therein are the percent amounts of distillate recovered and the amount of TOT catalyst employed. In Examples 7, 8, 9 and 11 DMT sublimation was effectively suppressed. Although such sublimation was less than satisfactorily suppressed in Example 10 (using 1-hexanol), it is anticipated that higher amounts, e.g. 2-3 or more weight percent, of 1-hexanol would be effective for sublimation supression. Melt viscosity increases were suppressed near the end of the reaction in each of these Examples 7-11. Portions of each of the polyesterimide resins of Examples 7-11 were coated on electrically conductive aluminum substrates using the procedure therefor in Examples 1-6, and cured for 10 minutes at 300° C. to form clear, tough, durable films characterized with good bubble-free properties.

grams (0.147 mole) TMA, 14.53 grams (0.073 mole) MDA, and 0.08 gram TOT catalyst. Reaction was affected substantially as described in Example 2 except that the mixture became stirrable after 15 minutes at a temperature of 110° C. Stirring was continued at 200 rpm and within 5 minutes thereafter a reddish-yellow precipitate was formed. Then stirring was increased to 300 rpm (pot temperature of 125° C.). Deposition of the DMT sublimate was then noticed and 0.89 grams 1-decanol was immediately added to the reaction mixture. An immediate curtailment of sublimate formation and deposition was observed. After a total of about 2.1 hours after heating was begun the temperature of the reaction mixture was 213° C. and it converted into a clear, homogeneous melt. There was no accumulation of DMT sublimate deposition and no heat gun was required. About 20 minutes later with a total of 7 grams distillate recovered, the reaction was terminated by pouring the resulting resin into an aluminum pan and allowing it to cool to room temperature. Using the film application procedure of the previous examples, a cured film of this resin was formed on an aluminum substrate and upon curing was found to be a tough, durable, clear, essentially bubble-free film. The amount of distillate recovered was 57% of the theoretical amount.

The —OH group —COO—group ratio described in the text above was about 1.7 for each of the reaction mixtures employed in Examples 1-12.

EXAMPLE 13

This example illustrates the process of the present invention employing a mixture of anhydrides as the anhydride component. Namely, 4-BPADA was in-

TABLE III

| Example | Monohydric Alcohol | | | | EG | | % Distillate$^b$ | TOT(grams) |
|---|---|---|---|---|---|---|---|---|
| | Type | Wt. %$^a$ | grams | moles | grams | moles | | |
| 7 | -dodecanol | 22.9 | 139.75 | 0.75 | 23.25 | 0.375 | 101 | 1.9 |
| 8 | -nonanol | 2.2 | 10.82 | 0.075 | 44.18 | 0.713 | 100 | 0.4 |
| 9 | -octanol | 2.0 | 9.77 | 0.075 | 44.18 | 0.713 | 97 | 0.4 |
| 10 | -hexanol | 1.5 | 7.66 | 0.075 | 44.18 | 0.713 | 101 | 0.4 |
| 11 | 2-ethylhexanol | 2.0 | 9.77 | 0.075 | 44.18 | 0.713 | 100 | 0.4 |

$^a$Based on total weight of the reaction mixture
$^b$Amount recovered as a percent of theoretical amount (calculated as in Example 1)

EXAMPLE 12

This example illustrates the resin preparation process of this invention employing 1,1,1-trimethylol ethane as the polyhydric alcohol component. To a resin kettle were added the following ingredients in the indicated amounts: 0.89 gram 1-decanol (0.006 mole), 9.28 gram (0.150 mole) EG, 12.83 grams (0.107 mole) 1,1,1-trimethylol ethane, 21.34 grams (0.110 mole) DMT, 28.16 cluded with TMA as a two-member anhydride component. The reaction was carried out substantially as described in Example 2 using the below indicated amount of the following ingredients: 18.6 grams (0.300 mole) EG, 172.52 grams (0.660 mole) THEIC, 102.82 grams (0.530 mole) DMT, 88.51 grams (0.461 mole) TMA, 103.05 grams (0.198 mole) 4-BPADA, 84.78 grams (0.428 mole) MDA, 5.14 grams (0.032 mole) 1-decanol, and 0.154 gram TOT catalyst. The reaction proceeded with heating and stirring and was terminated after 57% of the theoretical amount of distillate had been collected. No sublimate deposition problems were encountered during this reaction. A film of the resulting resin prepared on an aluminum substrate upon curing at about 300° C. for about 10 minutes was found to be tough and durable.

It is to be understood that the foregoing detailed description is given merely by way of illustration and that numerous modifications may be made therein without departing from the spirit or scope of the present invention.

Care should be taken to exclude lubricants, e.g. silicone, oil, grease, etc. from the PESI resin-forming reaction vessel.

What is claimed is:

1. A process for preparing a polyesterimide resin having increased stability against gelation and wherein during the process, sublimation of the lower dialkyl ester of a phthalic acid component is substantially reduced, which process comprises reacting under ester imide resin forming conditions a reaction mixture composition consisting essentially of:
   (I) an imide-group-contributing component selected from the group consisting of
     (A) both (1) a diamine component and (2) an anhydride component including at least one (a) aromatic carboxylic acid anhydride containing at least one additional carboxylic group, said additional group being esterifiable and substantially non-imidizable, or (b) the corresponding acid thereof containing two-imide-forming vicinal carboxylic groups in lieu of the anhydride group.
     (B) the carboxy functional polyimide reaction product of said diamine component and said anhydride component, and
     (C) mixtures of (A) above and (B) above;
   (II) an ester-group-contributing component comprising
     (D) at least one dihydric alcohol containing two esterifiable hydroxy groups,
     (E) at least one polyhydric alcohol containing at least three esterifiable hydroxyl groups,
     (F) at least one lower dialkyl ester of a phthalic acid component selected from the group consisting of terephthalic acid, isophthalic acid, and mixtures of said acids; and
     (G) a saturated aliphatic monohydric alcohol selected from the class consisting of n-hexanol, 2-ethylhexanol, n-nonanol n-decanol, n-dodecanol, 2-butyloctanol, tetradecanol, 2,6,8-trimethylnonane-4-ol, and mixtures thereof, wherein said reaction mixture comprises (a) from about 0.035 to 0.25 mole of the dihydric alcohol, (b) from about 0.025 to 0.15 mole of the polyhydric alcohol, (c) from about 0.03 to 0.18 mole of the lower dialkyl ester, (d) from about 0.1 to 0.2 mole of the aromatic carboxylic acid anhydride containing at least one additional carboxylic group, (e) from 0.05 to 0.10 mole of the diamine component, and from about 1.0 to 20.0 parts of the monohydric alcohol, said amounts being per 100 parts, by weight, of the total weight of the five components (a) through (e) recited herein.

2. The process of claim 1 wherein the reaction mixture is substantially free of solvents which do not react to form either imide groups or ester groups.

3. The process of claim 1 wherein the diamine component includes at least one aromatic diamine.

4. The process of claim 3 wherein no aliphatic diamine is present.

5. The process of claim 1 further including the step of removing the resulting lower alcohol derived from the lower dialkyl ester and the liberated water of reaction.

6. The process of claim 1 wherein component I above is a mixture of a diamine and a trimellitic component selected from the group consisting of trimellitic acid, trimellitic anhydride and mixtures thereof; and reaction is continued until at least 50% of the theoretical amount of the lower alcohol derived from the lower dialkyl ester is formed and until at least 50% of the theoretical amount of water of esterification of the additional —COO— group of the trimellitic component is formed.

7. The process of claim 1 wherein the ratio of the total number of hydroxl (—OH) groups in the mono-, di-, and polyhydric alcohols to the total number of ester-forming carboxyl (—COO—) groups in (a) the anhydride component and (b) the lower dialkyl esters is more than 1-OH group per —COO—group.

8. The process of claim 7 wherein said ratio is from about 1.05 to about 2.5 —OH groups per —COO— group.

9. The process of claim 8 wherein said
   (a) diamine component comprises a diamine selected from the group consisting of 4,4'-methylene dianiline, 4,4'-oxydianiline, and mixtures thereof,
   (b) said anhydride component comprises a member selected from the group consisting of trimellitic acid, trimellitic anhydride, and mixtures thereof
   (c) said at least one dihydric alcohol comprises ethylene glycol,
   (d) said at least one polyhydric alcohol is tris-(2-hydroxyethyl)isocyanurate,
   (e) said lower dialkyl ester is a diester of terephthalic acid, and
   (f) said organic compound having monohydric alcohol functionality is a linear or branched monohydric alcoholic compound having a normal boiling point from about 150° C. to about 270° C. or a mixture of two or more of said compounds.

10. The process of claim 9 wherein said boiling point is from about 180° C. to about 270° C.

11. The process of claim 9 wherein said organic compound having monohydric alcohol functionality is selected from the group consisting of n-hexanol, 2-ethylhexanol, n-nonanol n-decanol, n-dodecanol, tetrahydrofurfural, 2-butyloctanol, tetradecanol, 2,6,8-trimethylnonane-4-ol, and mixtures thereof.

12. The process of claim 9 wherein said organic compound having monohydric alcohol funtionality has from 8 to 10 carbon atoms.

13. The process of claim 12 wherein the monohydric alcohol is 1-decanol.

14. The process of claim 7 wherein said reaction mixture comprises (a) from about 0.035 to about 0.250 mole of ethylene glycol, (b) from about 0.025 to about 0.150 mole of tris (2-hydroxyethyl)isocyanurate, (c) from about 0.030 to about 0.180 mole of dimethyl terephthalate, (d) from about 0.100 to about 0.200 mole of trimellitic acid, trimellitic anhydride or mixtures thereof, (e) from about 0.050 to about 0.100 mole of a diamine selected from the group consisting of 4,4'- methylene dianiline, 4,4'-oxydianiline, and mixtures thereof, and from about 1.000 to about 20.00 parts of a monohydric alcohol having from 8 to 10 carbon atoms, said amounts being per 100 parts by weight of the total weight of the five components (a) through (e) recited in this claim.

15. The process of claim 1 wherein the anhydride component comprises a trimellitic compound selected from the group consisting of trimellitic acid, trimellitic anhydride, and mixtures thereof and a member selected from the group consisting of 2,2-bis[4-(2,3-dicarboxyphenoxy)phenyl]propane dianhydride, 2,2-bis[4-(3,4-dicarboxyphenoxy)phenyl]propane dianhydride, the corresponding tetra-acids thereof, and mixtures thereof.

16. The product prepared by the process of claim 1.
17. The product prepared by the process of claim 6.
18. The product prepared by the process of claim 9.
19. The product prepared by the process of claim 13.
20. The product prepared by the process of claim 14.
21. The product prepared by the process of claim 15.
22. A substrate having a cured coating of the product of claim 16.
23. An electrical conductor having a cured coating of the product of claim 16.
24. An electrical conductor having a cured coating of the product of claim 18.

* * * * *